United States Patent
Dultz et al.

(10) Patent No.: US 7,769,300 B1
(45) Date of Patent: Aug. 3, 2010

(54) REDUCING THE DISTORTION OF OPTICAL PULSES CAUSED BY POLARIZATION MODE DISPERSION IN OPTICAL COMMUNICATION SYSTEMS

(75) Inventors: Wolfgang Dultz, Frankfurt am Main (DE); Leonid Beresnev, Columbia, MD (US); Erna Frins, Montevideo (UY); Franko Kueppers, Darmstadt (DE); Heidrun Schmitzer, Chemnitz/Einsiedel (DE); Joachim Vobian, Muehltal (DE); Werner Weiershausen, Muehltal (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/890,597

(22) PCT Filed: Jan. 17, 2000

(86) PCT No.: PCT/EP00/00320
§ 371 (c)(1),
(2), (4) Date: May 24, 2002

(87) PCT Pub. No.: WO00/46942
PCT Pub. Date: Aug. 10, 2000

(30) Foreign Application Priority Data
Feb. 3, 1999 (DE) ................................ 199 04 137

(51) Int. Cl.
*H04B 10/00* (2006.01)
(52) U.S. Cl. ................ 398/152; 398/65; 398/147; 398/158; 398/159; 385/11; 356/73.1
(58) Field of Classification Search ................ 398/140, 398/141, 147, 148, 152, 158, 159, 161, 162, 398/182, 184, 149, 160, 65, 81, 79, 33, 25, 398/26, 27; 385/11, 123, 124, 14, 27; 356/73.1
See application file for complete search history.

(56) References Cited

U.S. PATENT DOCUMENTS
4,389,090 A 6/1983 LeFevre
(Continued)

FOREIGN PATENT DOCUMENTS
DE 92 16 439 U1 4/1993
EP 0 716 516 6/1996

OTHER PUBLICATIONS
M. Rasztovits-Wiech, M. Danner, W.R. Leeb, "Optical signal-to-noise ratio measurement in WDM networks using polarization extinction", Sep. 20-24, 1998, Marid, Spain, vol. 1, pp. 549-550.*
(Continued)

*Primary Examiner*—Hanh Phan
(74) *Attorney, Agent, or Firm*—Kenyon & Kenyon LLP

(57) ABSTRACT

A method and device for reducing the distortion of optical pulses caused by the polarization mode dispersion in optical communication systems is provided. When an optical pulse having any polarization is transmitted through an optical communication system, which is optically anisotropic, at least in sections, the optical pulse may become distorted due to the different velocities of the various polarization components. This distortion of the optical pulses may reduces the maximum transmission rate of the system. A method is provided for functioning in response to the detected transmission quality of the communication system where a polarization-controlling device for setting the polarization of the optical pulse is driven in such a way that the transmission quality is maximized. An optical communication system, including an optical transmission medium, involves a device for determining the transmission quality of the communication system, a regulating device, and a polarization-controlling device. The output signal from the device for determining the transmission quality of the communication system may be applied to the regulating device, which drives the polarization-controlling device to change the polarization of the optical pulses in such a way that the transmission quality is optimized.

7 Claims, 2 Drawing Sheets

U.S. PATENT DOCUMENTS

| | | | |
|---|---|---|---|
| 5,311,346 A * | 5/1994 | Haas et al. | 398/146 |
| 5,371,597 A * | 12/1994 | Favin et al. | 356/367 |
| 5,414,550 A * | 5/1995 | Ono | 398/204 |
| 5,473,457 A * | 12/1995 | Ono | 398/185 |
| 5,596,441 A * | 1/1997 | Sakakibara et al. | 398/205 |
| 5,659,412 A * | 8/1997 | Hakki | 398/152 |
| 5,793,511 A | 8/1998 | Bulow | |
| 5,930,414 A * | 7/1999 | Fishman et al. | 385/11 |
| 6,130,766 A * | 10/2000 | Cao | 398/147 |
| 6,339,489 B1 * | 1/2002 | Bruyere et al. | 398/147 |
| 6,404,520 B1 * | 6/2002 | Robinson et al. | 398/9 |

OTHER PUBLICATIONS

Winters et al, "Optical Equalization of Polarization Dispersion", Proceedings of the SPIE, Jan. 1, 1992, abstract and pp. 348-349, 354, 355, figs. 1, 2, 5, 6.

Shimizu et al., "Highly Stable Polarization Controller Using Fiber Squeezers", Proceedings of the European Conference on Optical Communication (ECOC), S, Gothenburg, Chalmers University, vol. Conf. 15, 1989, pp. 543-546.

Morkel et al., "PMD-Induced Ber Penalties in Optically-Amplified IM/DD Lightwave Systems", Electronics Letters, GB, IEE Stevenage, vol. 30, No. 10, May 12, 1994, pp. 806-807.

* cited by examiner

REDUCING THE DISTORTION OF OPTICAL PULSES CAUSED BY POLARIZATION MODE DISPERSION IN OPTICAL COMMUNICATION SYSTEMS

FIELD OF THE INVENTION

The present invention relates to a method for reducing the distortion of optical pulses in optical communication systems, and to an optical communication system having reduced spreading of the optical pulses propagating through the system.

BACKGROUND INFORMATION

In optical communications, optical components, such as optical elements and glass fibers, which are only isotropic in the first approximation or which are innately anisotropic are believed to be used. For example, the glass fibers employed in photonic networks may exhibit optical anisotropies due to the manufacturing process and design or due to other circumstances, such as temperature and pressure fluctuations, as well as because of the bending of the fiber itself. These, in part, location-dependent anisotropies may also produce an optical birefringence (or double refraction), which can also vary from location to location in the fiber. The birefringence (or double refraction) may result in two orthogonally polarized natural waves of the light propagating at a different phase velocity in one fiber section under consideration. When an optical signal, e.g., an optical pulse having any polarization, is transmitted through the fiber, the optical pulse is believed to become distorted, i.e., spreads during the course of propagation, due to the difference in the velocity of the various polarization components. This spreading of the optical pulses may limit the transmission rate in the communication system.

The reference of "Optical Equalization of Polarization Dispersion", J. H. Winters et al., Proceedings of the STIE, Jan. 1, 1992, discusses an optical equalizing system, which can be used to reduce the influences of polarization mode dispersion. It is believed that to generate the control signals for the polarization-controlling elements, the optical received signal is received in its entirety in one or a plurality of receivers and is analyzed accordingly. A further transmission of the optical signal is believed to be no longer possible.

The U.S. Pat. No. 5,793,511 discusses an optical receiver having an equalizing circuit which is able to equalize an optical signal distorted by polarization mode dispersion. For this, the received optical signal is converted into two electrical components, of these, the equalizing circuit generating a quality signal for driving a polarization control element implemented in the receiver.

The European Patent Publication No. 0 716 516 discusses a polarization-diversity detection technique for optical signals transmitted over a single-mode fiber. To compensate for distortions caused by polarization mode dispersions in the fiber, a polarization-diversity detection is carried out. For this, it is believed that the optical received signal is initially separated by a polarization beam splitter into a first and second polarization component. A control signal is believed to be subsequently generated to control a polarization-control element as a function of the phase difference between the two polarization components.

SUMMARY OF THE INVENTION

An exemplary embodiment of the present invention is directed to providing a method for reducing the distortion of optical pulses in optical communication systems caused by polarization mode dispersion, which can be implemented cost-effectively, flexibly adapted to the particular optical communication system, and which also allows for dynamic fluctuations with respect to the birefringence. Exemplary embodiments of the present invention are further directed to providing a suitable optical communication system in part which may effect the method for reducing the distortion of optical pulses in optical communication systems caused by polarization mode dispersion.

To keep the transmission quality in the optical communication system at an optimal value, the transmission quality is measured, and a signal indicative thereof is applied to a regulating device, which drives a polarization-controlling device to alter the polarization state of the communication-transmitting optical pulses. The regulating device controls the polarization of the optical pulses in such a way that the transmission quality is optimized. A small coupled-out portion of the communication-transmitting luminous flux may be used to determine the transmission quality.

Any transmission device at all, for example, an optical fiber or other optical component, can be composed with respect to its birefringence properties, of a number of double-refracting plates, each of which has a different, statistically varying birefringence, delay and orientation. A double-refracting plate assembly of this kind is characteristic for a specific wavelength and is, therefore, dependent upon the frequency of the incident light.

An actual glass fiber may be constituted of a plate assembly, which is not characterized by a stochastic system (or arrangement) of double-refracting plates, but rather that there is at least one preferred, i.e., substantially constant, birefringence in specific sections of the fiber. This means that the optical properties in the mentioned fiber sections can be specified by a single, thick and/or heavily double-refracting plate. An information signal, which propagates within such a section in the sense of an optical pulse and which couples to the same extent into both (intrinsic) polarization states of the substantially constant birefringent fiber member, is split into two pulses of the same intensity, but of orthogonal polarization. Both pulse components exhibit a different group velocity in the medium, so that an especially high distortion, i.e., spreading of the originally injected signal pulse, occurs due to the polarization mode dispersion, which limits the communication transmission rate, in particular.

An exemplary embodiment of the present invention is directed to assuring that the optical pulse propagates within the optical communication system having at least one section with preferred or substantially constant birefringence, in such a way that, in the at least one section, the signal exhibits a polarization which corresponds to one of the two main polarization states of the section, e.g., a fiber member. As a result, the pulse shape may not be broadened during transmission by the section having preferred or substantially constant birefringence. Within the section having preferred birefringence, the optical pulses propagate only in one of the two possible channels, i.e., either in the channel having a high rate of propagation or in the channel having the slow rate of propagation, so that the optical pulses are not thereby split or widened, but only accelerated or delayed. This may have no adverse effect on the transmission rate, since the entire pulse sequence experiences an acceleration or delay. It is, thus, assured that the section of the optical transmission medium which exhibits a preferred or substantially constant birefringence and, therefore, may substantially contribute to the widening of the optical pulses, is "eliminated" with respect to the polarization mode dispersion within the entire communication system. The remaining broadening of the optical pulse may only still be caused by the remaining sections of the communication system, which can be described, for example, as a stochastic system or arrangement of thin, double-refracting plates. However, the extent to which these other sections of the communication system cause the optical pulse to widen is much less than the possible distortion of the pulse within the section having preferred or substantially constant birefringence, for the case that the light does not traverse the last-mentioned section in only one of the main polarization states.

The exemplary embodiments of the present invention are directed to providing that when the optical pulses are modified by the polarization-controlling device before entering into the optical communication system, such that the section having preferred or substantially constant birefringence is traversed in one of the main polarization states of the section and when only that portion of the optical information signal which is transmitted in one of the main polarization states of the section having preferred or substantially constant birefringence, through this section, is considered for the data transmission. Both cases are based on the elucidated principle of the present invention and, accordingly, are equivalent.

To alter the polarization of the information signal in accordance with the present invention, the polarization-controlling device is driven by the regulating device in such a way that the transmission quality is maximized. This regulated, maximal transmission quality corresponds accordingly, for example, to the case when the optical information signal propagates within the section having preferred or substantially constant birefringence in one of the two main polarization states, or when only that portion of the optical information signal, which this applies to, is considered.

Another exemplary embodiment of the present invention is directed to providing for repeatedly maximizing the transmission quality at spaced apart time intervals. The time-related fluctuations in the magnitude and orientation of the birefringence, which can have a negative effect on the distortion of the optical pulses can be diminished. These fluctuations, induced, for example, by temperature fluctuations in an optical fiber, may have the effect that the optical pulses no longer traverse the section having preferred or substantially constant birefringence in one of its main polarization states. By maximizing the transmission quality in repeated, spaced-apart time intervals, one cancels (or reverses) the spreading of the optical pulse caused by the fluctuations.

To allow for the variation over time in the polarization state at the input of the optical communication system, the polarization-controlling device can be connected upstream from the communication system. By regulating the polarization-controlling device, one assures that the section having preferred or substantially constant birefringence is traversed by the optical pulses in one of the two main polarization states of the section, in spite of the birefringence fluctuating over time in magnitude and orientation within the communication system.

To losslessly convert the light into the required polarization state, the polarization-controlling device can include a λ/4-, a λ/2- and a further λ/4 delay element, the delay elements being disposed one behind the other and each being adjustable. Using such a polarization-controlling device, light, for example light pulses having any polarization state at all, can be changed into light having a different, desired polarization state.

The polarization-controlling device can also be placed at the output of the communication system, however. This may simplify the control, since the determination of transmission quality, the control, and the polarization-controlling device are implemented at the same location. To consider only that component of the light which has propagated in the section having preferred or substantially constant birefringence in one of the main polarization states, an analyzer may be additionally configured downstream from the polarization-controlling elements.

If the analyzer is a linear analyzer, then the polarization-controlling device may be simplified to include only a λ/4- and a λ/2-delay element, each being adjustable, i.e., rotatable. Using a polarization-controlling device of this kind, light having any polarization at all—in this case light transmitted in one of its main polarization states through the portion having preferred birefringence—can be changed into light having a linear polarization—in this case light which is polarized in the transmit direction toward the analyzer.

The delay elements used can include a liquid crystal element or an electro-optic crystal, depending on the special application involved, for example, depending on the wavelength employed. In embodiments of the present invention, the adjusting elements may be readjusted without a driving mechanism, i.e., electrically. If the control takes place at frequencies which are not too high, simple, mechanically movable controlling elements may also be used.

DETAILED DESCRIPTION

Figure 1:
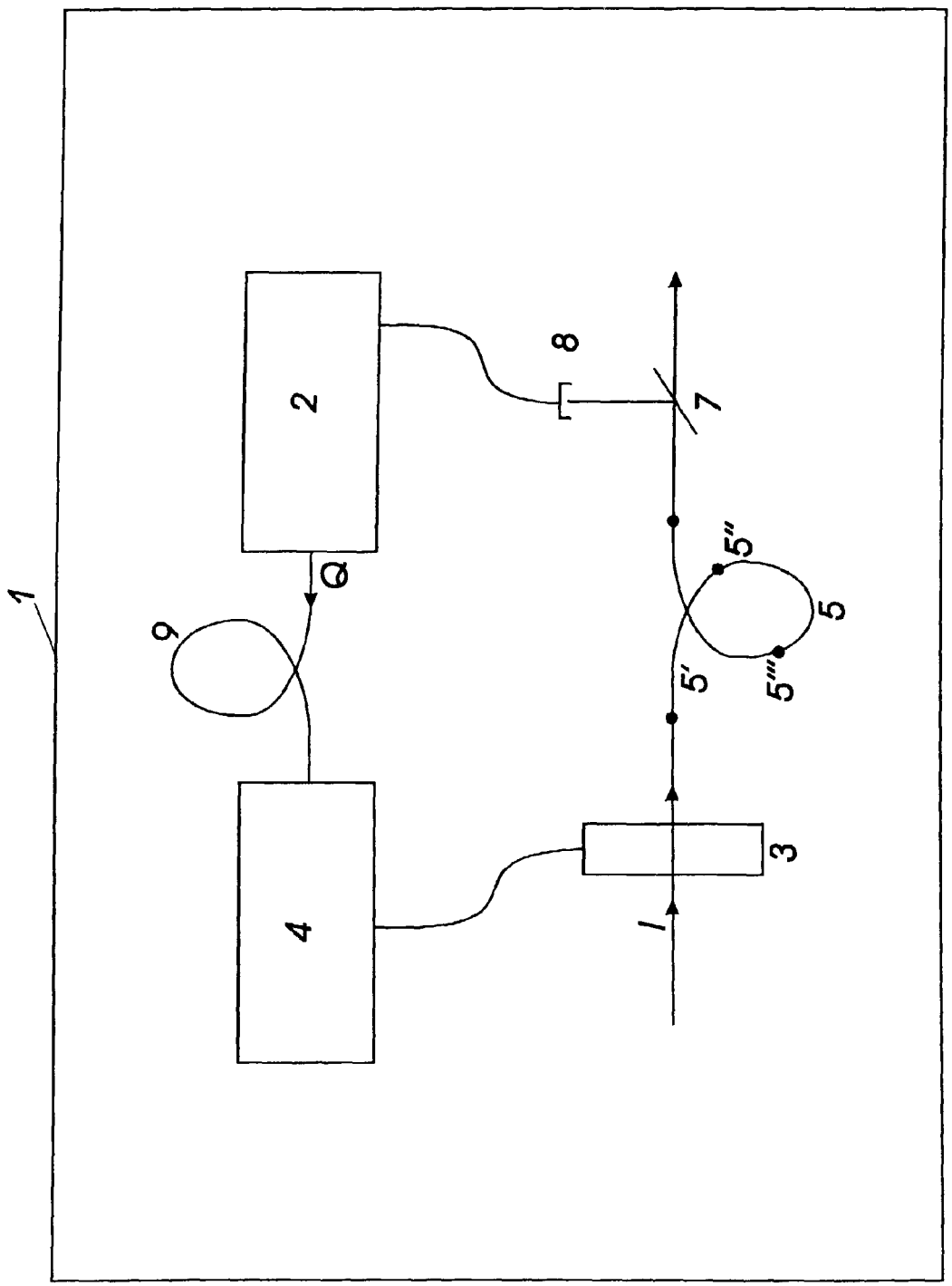
FIG. 1 shows an exemplary embodiment of the present invention where the polarization-controlling element is positioned upstream from the optical communication system.

The optical communication system having reduced distortion of the optical pulses passing through the system may include an optical transmission medium that is composed of various sections. These may include optical components, such as fiber couplers, switches, amplifiers, and other components, optical lines or fibers. At least one section of the communication system may exhibit a preferred or substantially constant birefringence. The optical communication system in accordance with the present invention may include a device for determining the transmission quality at the end of the communication system. This device may generate an output signal which is dependent upon the transmission quality and which is applied to the input of a regulating device. This regulating device drives a polarization-controlling device, through which the optical pulses are transmitted and which is, therefore, set up, or designed, for altering the polarization of the optical pulses. Functioning in response to the detected transmission quality of the communication system, the polarization-controlling device is driven to maximize the transmission quality; i.e., the various parameters for setting the controlling elements of the polarization-controlling device continue to be modified until the transmission quality is optimal and can no longer be improved. The polarization-controlling element may be regulated so that the transmission quality is measured; the controlling element is subsequently slightly reset (or readjusted) in any direction within a parameter space.

The transmission quality may subsequently be measured again. If the transmission quality has become greater, the regulating device resets the controlling element further in this direction; otherwise it does so in the opposite direction. If the transmission quality changes slightly or not at all, then the regulating device resets the polarization-controlling element in a direction that is orthogonal to the first direction in the parameter space. This method may lead to a local maximum of the transmission quality in the parameter space of the polarization-controlling element. The method may be repeated in specific intervals, which keeps the transmission quality of the communication system at a high level.

To ascertain the transmission quality, one can use the bit error rate, for example. It may be determined using special measuring instruments and indicates, as a ratio, how many read errors occur in a known sequence of transmitted pulses. Another exemplary embodiment of the present invention is directed to providing for the so-called eye pattern to be used as a measure of the transmission quality of the communication system. In addition, the polarization mode dispersion itself can also be used as a measure of the transmission quality. This may only be determined with relatively substantial outlay, as is the case for the bit error rate and the eye diagram. The exemplary embodiment of the present invention may be directed to using the redundancy monitoring employed in many digital transmission methods to obtain a measure of the transmission error and, thus, of the transmission quality in the communication system.

In the case of the redundancy monitoring, the so-called parity information (parity bytes) may be calculated from the payload to be transmitted, and added to the payload. The parity information may be obtained by performing a simple calculation. It is presently defined for optical communication systems having a synchronous digital hierarchy as the remainder from a quotient formed from the payload code and a preset key code. The parity information may be extracted and any data blocks having faulty information at all points on the optical transmission link where digital analysis of the signals is possible may be immediately recognized. In contrast to the bit error rate, the described redundancy monitoring may only permit one data block error rate to be determined, since each parity byte has assigned to it one complete data record which, accordingly, may only be checked as a whole. Since typically, however, in the case of signal distortion, such as in the case of optical pulse spreading due to polarization mode dispersion, no so-called burst errors occur, i.e., the errors are distributed more or less equally over time, the redundancy monitoring and a signal Q derived therefrom as an input signal may be suited for the regulating device.

FIG. 1 depicts an exemplary embodiment of an optical communication system 1 in accordance with the present invention having reduced distortion of the information signal propagating through the system. The optical information signal may be transmitted in the form of optical pulses through a polarization-controlling element 3, before entering into the optical transmission medium 5. This optical transmission medium 5 may include various sections 5', 5", 5''', in the present example, section 5" being a section in which a preferred birefringence occurs. The optical transmission medium may be constituted of an optical fiber line. The other sections 5', 5''' exhibit a stochastic distribution with respect to the birefringence. Accordingly, these regions are able to be characterized by a random arrangement of double-refracting plates. Behind (or downstream from) the transmission medium, the optical information signal, for example an optical pulse, may be incident to a beam splitter 7, which couples out a small portion of the communication-transmitting luminous flux. A detector 8 may convert the coupled-out portion of the information signal into an electric signal, which may be applied to a device 2 for determining the transmission quality of communication system 1. By the redundancy monitoring, a signal Q, which is a measure of the transmission quality, may be generated in device 2. This signal may be conducted via a data line 9, which essentially runs in parallel to optical transmission medium 5, as an input signal to regulating device 4. In an embodiment of the present invention, data line 9 may be a spectral channel of optical fiber 5. The regulating device may drive polarization-controlling device 3 to change the polarization of information signal I.

To reduce the distortion, for example, the spreading of information signals, such as of the optical pulses, in response to the detected transmission quality of communication system 1, polarization-controlling device 3 is driven by regulating device 2 to maximize the transmission quality. As a consequence of the above described control, the light in section 5" exhibiting the preferred or substantially constant birefringence has a polarization that corresponds to one of the main polarization states of the section, so that, within this region, no distortion occurs, i.e., the signal does not spread. Thus, with respect to the polarization mode dispersion, that region is "eliminated", which otherwise would substantially contribute to the distortion of the signal.

To compensate for time-related fluctuations of the birefringence and consequences resulting therefrom, provision may be made for the transmission quality to be repeatedly maximized at spaced apart time intervals. In this manner, at any particular point in time, the light within section 5" having the preferred or substantially constant birefringence may be always polarized in parallel to one of the main polarization states of the transmission medium section.

Referring FIG. 1, the polarization-controlling device 3 includes a $\lambda/4$-, a $\lambda/2$- and a further $\lambda/4$ delay element, these delay elements being disposed one behind the other and each being adjustable, i.e., rotatable. The three degrees of freedom of the polarization-controlling device are regulated by regulating device 4 in accordance with the method of the present invention. Using the entire polarization-controlling device 3, each desired polarization is able to be converted into another desired polarization. Delay elements can include liquid crystal elements, electro-optic crystals, or mechanically, electromotively or piezoelectrically adjustable delay elements, such as fiber loops.

Figure 2:
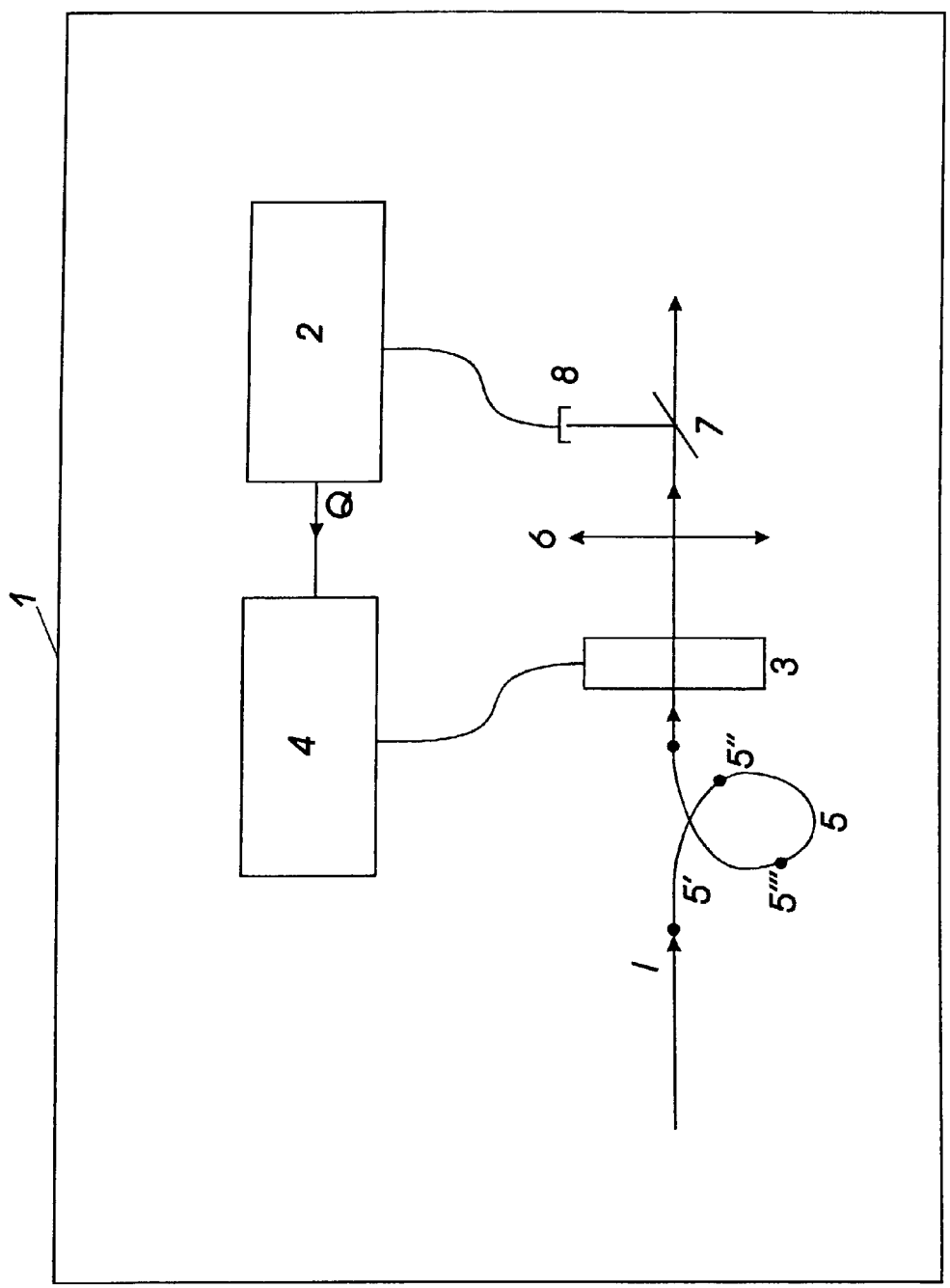
FIG. 2 shows an exemplary embodiment of the present invention where the polarization-controlling element is placed at the output end of the communication system.

FIG. 2 depicts an embodiment of the present invention, where polarization-controlling device 3 is configured downstream from the communication system which includes transmission medium 5 having at least one section 5" exhibiting a preferred birefringence. Situated in this specific embodiment downstream from the polarization-controlling device, is an analyzer 6, which may absorb or deflect the signal-spreading or signal-distorting polarization components of the optical information flow, depending on the specific embodiment of the analyzer. A small portion of the information flow is split (or separated) off by beam splitter 7 and supplied to detector 8. Its output signal is fed to a regulating device 2, which generates a signal Q that is a measure indicative of the transmission quality. This signal, in turn, is the input quantity for regulating device 4, which drives polarization-controlling device 3. The analyzer 6 may include a linear polarizer, so that the polarization-controlling element merely needs to still transform any particular polarization state into a fixed, linear polarization state. This may be done using a $\lambda/4$- and a $\lambda/2$- delay element, which are disposed in series (or one behind the other) and are each adjustable, i.e., rotatable.

The polarization-controlling device may be adjusted when the light which, in the fiber member having preferred or substantially constant birefringence, assumed the one main polarization state, may be imaged onto the light having the transmit polarization of the analyzer, whereas the light, which assumed the other polarization state, is imaged onto the light having the blocking polarization state of the linear polarizer. The light which is imaged onto the transmit polarization of the analyzer may exhibit the higher intensity portion of the entire signal intensity. Thus, the control unit may be set up such that, in response to too low optical intensity of the information flow downstream from the analyzer, the control unit may switch over to the other main polarization direction of the section of the communication system, such as fiber member 5", having the preferred or substantially constant birefringence.

A further exemplary embodiment of the present inventions, in place of beam splitter 7 and detector 8 in FIGS. 1 and 2, is directed to providing that the transmission quality be measured at the same time that the information itself is detected, directly by the main detector at the output of the transmission link.

What is claimed is:

1. A method of reducing distortion of optical signal transmission in an optical communication system, comprising:
   providing the optical communication system having at least one section of optical transmission medium which exhibits one of a preferred and a substantially constant birefringence;
   transmitting an optical signal in the optical communication system;
   measuring a transmission quality of the optical signal of the optical communication system;
   transmitting the optical signal indicative of the measured transmission quality to a regulating device;
   driving, by the regulating device, a polarization-controlling device to alter the polarization of the optical signal so that the transmission quality is optimized;
   using a small coupled-out portion of communication-transmitting luminous flux of the optical signal to determine transmission quality; and
   redundantly monitoring the optical communication system by observing parity information extracted from the optical communication system,
   wherein when within the at least one section of optical transmission medium, the optical signal propagates only in one of a channel having a high rate of propagation and in a channel having a slow rate of propagation to prevent any splitting or widening of the optical signal.

2. The method of claim 1, wherein the optical signal is first transmitted to the polarization-controlling device, then transmitted to the optical transmission medium, then transmitted to a beam splitter, the beam splitter coupling-out luminous flux of the optical signal, then the coupled-out luminous flux of the optical signal is transmitted to a detector which converts the luminous flux into an electric signal, and then the electric signal is transmitted to a measuring device to measure the transmission quality from the electric signal.

3. The method of claim 1, further comprising:
   measuring the transmission quality again so that:
      if the transmission quality has increased, then resetting by the regulating device the controlling element further in the present direction;
      if the transmission quality has decreased, then resetting by the regulating device the controlling element in a different direction;
      if the transmission quality evidences insignificant change, then resetting by the regulating device of the polarization-controlling element in a direction orthogonal to a first direction in the parameter space,
   wherein the measuring and resetting step is repeated at predefined spaced-apart time intervals to maximize the transmission quality of the optical communication system.

4. The method of claim 3, wherein a polarization-controlling device is connected at the input of the optical communication system.

5. The method of claim 3, wherein the polarization-controlling device includes at least one of a $\lambda/4$ delay element and a $\lambda/2$ delay element, the delay elements being disposed one behind the other and being adjustable to losslessly convert the light into a required polarization state.

6. The method of claim 3, wherein the polarization-controlling device is connected at the output of the optical communication system.

7. The method of claim 3, wherein an analyzer is connected downstream from the polarization-controlling device.

\* \* \* \* \*